(12) United States Patent
Teredesai

(10) Patent No.: US 8,491,793 B2
(45) Date of Patent: Jul. 23, 2013

(54) SOFTWARE PROGRAM THAT PROVIDES A STRUCTURED FORMAT AND VERIFICATION OF DATE ENTERED VIA A TOUCH SCREEN TABLET THAT RECORDS THE STATUS AND PERFORMANCE OF WATER PURIFICATION EQUIPMENT THAT IS USED FOR DIALYSIS TREATMENTS

(75) Inventor: Pradip Teredesai, Pittsburgh, PA (US)

(73) Assignee: Pradip Teredesai, Pittsburgh, PA (US)

( * ) Notice: Subject to any disclaimer, the term of this patent is extended or adjusted under 35 U.S.C. 154(b) by 146 days.

(21) Appl. No.: 13/050,220

(22) Filed: Mar. 17, 2011

(65) Prior Publication Data

US 2012/0239461 A1    Sep. 20, 2012

(51) Int. Cl.
*B01D 61/32* (2006.01)
*C02F 1/44* (2006.01)
*C02F 5/00* (2006.01)

(52) U.S. Cl.
USPC ........... 210/646; 210/647; 210/652; 210/663; 210/670; 210/657; 210/739; 210/741; 210/744

(58) Field of Classification Search
USPC ............ 210/85, 94, 96.2, 143, 321.71, 321.6, 210/646, 647, 652, 663, 669, 670, 675, 677, 210/739, 741, 744; 345/173, 179, 180; 700/273, 700/282; 705/2, 3, 28, 413; 604/65, 67, 4.01
See application file for complete search history.

(56) References Cited

U.S. PATENT DOCUMENTS

| | | | |
|---|---|---|---|
| 4,940,667 A * | 7/1990 | Goldstein et al. | 436/157 |
| 5,585,003 A * | 12/1996 | Van Newenhizen | 210/646 |
| 5,591,344 A * | 1/1997 | Kenley et al. | 210/636 |
| 6,039,877 A * | 3/2000 | Chevallet et al. | 210/636 |
| 6,280,634 B1 * | 8/2001 | Shah et al. | 210/739 |
| 6,398,965 B1 * | 6/2002 | Arba et al. | 210/652 |
| 2003/0034305 A1 * | 2/2003 | Luehmann et al. | 210/646 |
| 2004/0060860 A1 * | 4/2004 | Peterson et al. | 210/435 |
| 2004/0111293 A1 * | 6/2004 | Firanek et al. | 705/2 |
| 2004/0172302 A1 * | 9/2004 | Martucci et al. | 705/2 |
| 2005/0197859 A1 * | 9/2005 | Wilson et al. | 705/2 |
| 2007/0102357 A1 * | 5/2007 | Weatherill | 210/636 |
| 2011/0054378 A1 * | 3/2011 | Fulkerson | 604/5.01 |

* cited by examiner

Primary Examiner — Joseph Drodge

(57) ABSTRACT

A method of recording and monitoring the operation and status of devices operating to purify water employed in the operation of a dialysis clinic, by providing a software program that monitors water purification devices that include a water softener, brine tank and reverse osmosis machine. This computer program is a data logging system that enables the user to monitor and record the status and performance of water purification equipment that is housed and used in a dialysis clinic. The software program will be used by technicians that work in three shifts on a daily basis to ensure that the water being purified for dialysis treatment is within an acceptable range of purity. This software replaces a paper logging system and is more versatile in security, accuracy, function and reporting.

9 Claims, No Drawings

SOFTWARE PROGRAM THAT PROVIDES A STRUCTURED FORMAT AND VERIFICATION OF DATE ENTERED VIA A TOUCH SCREEN TABLET THAT RECORDS THE STATUS AND PERFORMANCE OF WATER PURIFICATION EQUIPMENT THAT IS USED FOR DIALYSIS TREATMENTS

CROSS-REFERENCE TO RELATED APPLICATION

None

STATEMENT REGARDING FEDERALLY SPONSORED RESEARCH OR DEVELOPMENT

N/A

THE NAMES OF THE PARTIES TO A JOINT RESEARCH AGREEMENT

N/A

Reference to a computer program listing appendix submitted on a compact disc. This CD is submitted for exhibit purposes only.

```
/Waterroom : water.accdb
  /Banksville :  water_data.accdb
  /Data    : water_dataMT.accdb
  /Hopewell :   water_data.accdb
  /Images : 3-REPORTS.gif
     202006-0 Liberty Hopewell - Flow Only.pdf
     BicarbLog.jpeg
     ChlorineLog.jpeg
     colon.jpeg
     DailysummaryLog.jpeg
     DailySummaryLog_mini.jpeg
     DelatPressureReadings.jpeg
     DryAcidLog.jpeg
     GreenCheck.jpeg
     Liberty_Hopewell_Flow_Only.jpeg
     P1_PreMultiMedia.jpeg
     P1_PreMultiMedia_mini.jpeg
     P2_PostMultiMedia.jpeg
     P2_PostMultiMedia_Mini.jpeg
     P3_PostSoftener.jpeg
     P3_PostSoftener_mini.jpeg
     P4_PostPrimaryCarbon.jpeg
     P4_PostPrimaryCarbon_mini.jpeg
     P5_PrefilterPressureRO.jpeg
     P6_PreUltraFilter.jpeg
     P6_PreUltraFilter_mini.jpeg
     P7_PostUltrafilter.jpeg
     P7_PostUltrafilter_mini.jpeg
     Ranges.jpeg
     RexX.jpeg
     reports.jpeg
     RO Panel.jpeg
     RO Panel close.jpeg
     RO.2 Water Hardness.jpeg
     RO.13 Pump Control.jpeg
     RO.14 Lamp Meter.jpeg
     RO.15 Brine Tank.jpeg
     RO.16 clock A.jpeg
     RO.16 clock B.jpeg
     RO.16 clock C.jpeg
     RO.16 clock D.jpeg
     RO.16 Clocks.jpeg
     Slash.jpeg
     TankLogs.jpeg
     test.png
     Tools.bmp
     Untitled.png
     WaterRoom32x32.icon
     WaterRoom128x128.icon
     WaterRoomFlow.bmp
     WaterRoomFlow.txt
     WaterRoomFlow.jpeg
     WaterRoomFlowLarge.jpeg
     WaterRoomFlowMini.jpeg
  /Pittsburgh : water_data.sccdb
  /Screenshots :   1 Main Menu.png
                   2 Daily Summary.png
                   3 RO Log.png
                   4 Delta Pressure Readings.png
                   5 Tanks Log Menu.png
                   6 Chlorine Log.png
                   7 Bicarb Log.png
                   8 Acid Log.png
```

BACKGROUND OF THE INVENTION

The invention is software written in Microsoft Access that is used to address the logging of information collected from water purification equipment that is housed in a water room adjacent to a dialysis clinic. The software was created to replace the system of a paper based recording process that was not sufficiently monitored and not useful for reporting over a period of time. The software allows for added security, conformity to performance requirements and follow through for the actions of the user The software is also able to be used as a training device to train new users how the water purification process functions.

BRIEF SUMMARY OF THE INVENTION

The invention is software used on a touch screen laptop that allows for the logging of data that is collected from equipment in a water room where water is purified for use in dialysis. The data that is being logged on a daily basis is a process by which the user monitors the performance of the water purification equipment and ensures an acceptable quality of purified water as well as the maintenance and care of the equipment.

BRIEF DESCRIPTION OF THE DRAWINGS

N/A

DETAILED DESCRIPTION OF THE INVENTION

The software program is installed on a portable tablet computer with a touch screen for data entry using a stylus. The user is able to carry the tablet through the water-room to monitor the status of the water purifying equipment.

The users and supervisors will sign into software with secure username and passwords.

The user will turn on the Reverse Osmosis (RO) machine and record the time of day the RO was turned on. A timer is then triggered to ensure that 15 minutes elapses before the first reading is taken.

The water hardness reading is taken and recorded.
The concentrate flow rate reading is taken and recorded.
The permeate flow rate reading is taken and recorded.
Pressure readings are observed before and after the filter and readings are recorded. From the readings a delta pressure is calculated and posted in the software.
A permeate conductivity reading is taken and recorded.
The percent rejection reading is taken and recorded.
The temperature of the water is recorded.
The primary and final membrane pressure reading is taken and recorded.

The distribution pump is observed, and pump 1 or pump 2 is noted.

The UV lamp is observed and confirmation of functionality is recorded.

The level in the brine tank is checked and recorded.

Time of day on each of the pre-treatment filters is confirmed and recorded.

Delta pressure readings are taken including; pre multi media, post multi media, post softener, post primary carbon, pre ultra filter and post ultra filter. Each pressure change is calculated and verified within range.

End of the day, water hardness reading is taken and recorded.

All of the above readings are then initialized by the user and verified by a supervising RN. If any of the entered data is out of expected range, built in flags will trigger a warning action or an alarm action. Actions include equipment modifications, filter changes, email or text alert to supervisors, or equipment replacement.

All data is time-stamped and logged into a database for use with weekly and monthly administrative reports. As well as long term evaluation of equipment performance, maintenance and warranty tracking.

The invention claimed is:

1. A method of recording and monitoring the operation and status of devices operating to purify water employed in the operation of a dialysis clinic, comprising:
   providing a software program that monitors water purification devices that include a water softener, brine tank and reverse osmosis machine, the devices being located in a water room adjacent to the dialysis clinic, the software program being operable to time stamp start of the reverse osmosis machine operation, and after elapse of a selected, timed interval, initiate recording of a plurality of readings of water parameters indicative of the machine operation and performance, and being operable for recording parameters indicative of water softener and brine tank performance, and
   initiating operation of the water purification devices and corresponding operation of the software program.

2. The method of claim 1, wherein the water purification devices further comprise one or more devices selected from the group consisting of: UV lamp, pump, valves, clocks, additional filters and tanks, the software program being further operable to record parameters indicative of operation of the one or more devices.

3. The method of claim 1, wherein the software program is adapted to be employed with a touch screen device, optionally a tablet, the touch screen optionally adapted for interface with a stylus pen.

4. The method of claim 1, wherein the software program is further operable to initiate warnings and messages for suggested actions upon recording of an out-of-range parameter.

5. The method of claim 1, wherein the software program is further operable for tracking of warranties and replacement history of the devices.

6. The method of claim 1, wherein the software program is further operable to display pictures of the devices and documentation of how to operate the devices.

7. The method of claim 1, wherein the software program is adapted for operation with secure usernames and passwords.

8. The method of claim 1, wherein the reverse osmosis machine parameters comprise readings of water hardness, concentrate and permeate respective flow rates, pressures, permeate conductivity, percent rejection, water temperature.

9. The method of claim 1, wherein the software program employs a database for establishing periodic administrative reports, allowing long-term evaluation of equipment performance, maintenance and warranty tracking.

\* \* \* \* \*